Oct. 11, 1949.    J. R. BAYSTON    2,484,371
PUMP UTILIZING THE HEAT OF LIQUIDS
IN A PLUMBING SYSTEM
Filed Dec. 4, 1947
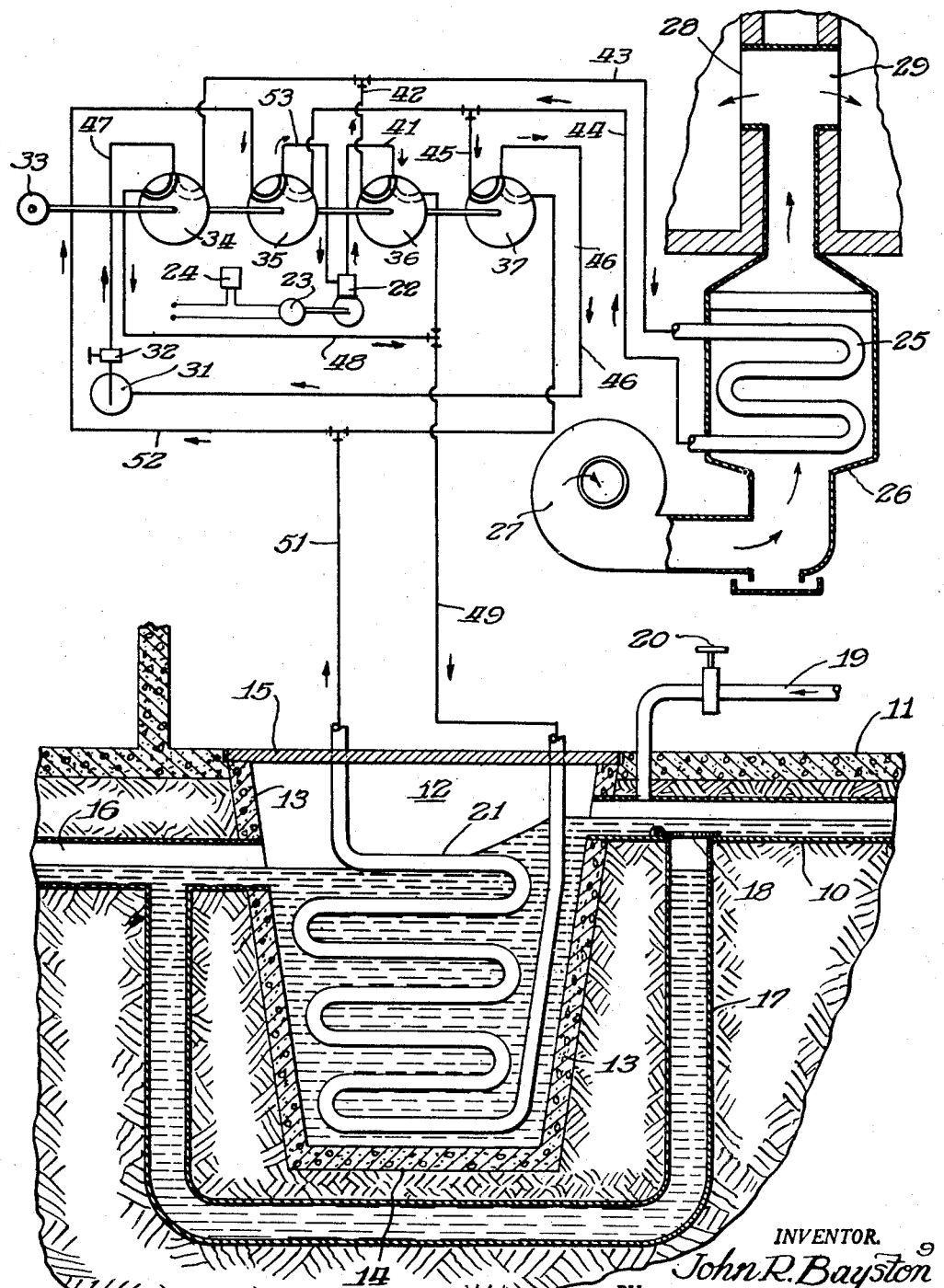
INVENTOR.
John R. Bayston
BY
Clarence J. Loftus
ATTY.

Patented Oct. 11, 1949

2,484,371

UNITED STATES PATENT OFFICE 2,484,371

PUMP UTILIZING THE HEAT OF LIQUIDS IN A PLUMBING SYSTEM

John R. Bayston, Chicago, Ill.

Application December 4, 1947, Serial No. 789,601

2 Claims. (Cl. 62—129)

The present invention relates to space heating systems and more specifically to a heat exchanging apparatus adapted to draw heat from a remote source by means of an evaporator, and having a compressor and condensing coil to transfer the heat into the interior of the building to be heated.

It may be explained that space heating is ordinarily accomplished by some mode of direct combustion, yet, notwithstanding the fact that the products of combustion necessarily cause a good deal of smoke, dirt and odor, yet no adequate alternative has heretofore been suggested. It has been known, of course, that the heat present in the earth may be salvaged by a more or less conventional refrigerating system so that the condensing coils of the system function as space heaters, but the practical limitations of efficiency of these systems have heretofore limited their usefulness. This appears to be because the comparatively low temperature of the earth from which the prior systems have attempted to extract heat have made such apparatus costly and inefficient, even when operating below the frost line where the temperature is fairly constant. Earlier efforts at perfecting such systems have also been unfavorably affected by the insulating effects of the earth, so that although heat is readily withdrawn from the earth immediately adjacent the evaporator coils, the continued use of the device builds up a layer of cold earth around the coils that acts as an insulator and destroys the efficiency of the machine.

It is, therefore, one of the primary objects of the present invention to provide a space heating system adapted to the utilization of waste heat exchanged by a refrigerating system and consequently without direct combustion, but wherein the heat is taken from a source warmer than the ordinary earth temperature so that the capacity of the heat transfer system is greatly increased.

A further object of the invention resides in the provision of a heat exchange system adapted to utilize the heat present in waste products. Specifically, the invention contemplates the provision of a reservoir in the drain line of the plumbing system of a building as the source of heat for an exchanging system, so that the waste heat available in hot bath water, dish water, etc., may be used to the fullest possible extent. In this connection it is to be remembered that even without the addition of hot water, the fluids in the drain line of a plumbing system provide a source of heat much more satisfactory than sand or earth, not only because the natural circulation of the liquid about the coils prevents the formation of an insulating layer around the coils, but primarily for the reason that the water from the incoming mains, which ordinarily enters a building at about the temperature of the earth below the frost line, is necessarily warmed in passing through the plumbing system of a heated building. In addition, the temperature of the waste products in the drain lines is increased by chemical action incident to putrefaction of waste products. Thus, the heat generated by chemical reaction, the heat taken on by water throughout the plumbing system, and the added heat present in any waste bath water, dish water, etc., all contribute to the total available for use.

A still further object of the invention resides in the provision of a system as indicated above together with reversing valves to reverse the flow of refrigerant through the coils so that the system may be utilized as a cooling system during extremely hot weather.

Those objects are accomplished in the present invention by the use of a system diagrammatically illustrated in the single sheet of drawings attached to and forming a part of this specification. The system includes, in general, a reservoir in the drain line of the plumbing system, together with a more or less conventional refrigeration system to draw heat from this reservoir by an evaporator and pass it to a condenser functioning as the space heater. The drain line 10, which in most installations is located below the level of the basement floor 11, is brought to a waste reservoir 12 having inclined side walls 13 and a bottom wall 14. In the exact form of the invention illustrated, the reservoir is positioned below the surface of the floor 11, and the side walls 13 are inclined outwardly toward the top of the reservoir so that there is little likelihood of damage to the structure even if the liquid in it should become frozen. The reservoir is shown as being provided with a removable cover 15 and is connected to the sewage system by an outlet pipe 16 somewhat below the level of the drain inlet 10. A by-pass 17 extends directly from the drain line 10 to the pipe 16 and a two-way valve 18 is provided so that the flow of waste products from the pipe 10 may either be directed into the reservoir 12 or may be passed directly into the drain outlet 16. A cold water supply pipe 19 may also be connected to feed water into the reservoir under the control of a valve 20.

The reservoir 12 includes a refrigerant coil 21 which normally functions as an evaporator coil and is connected through suitable pipe lines to a compressor 22 driven by an electric motor 23 and controlled by a thermostatic switch 24. The refrigerating system also includes a refrigerant coil 25 in an air duct 26, with a blower 27 to force air over the coil and through outlets 28 and 29 into the rooms of the building. The system includes a liquid receiver 31 and expansion valve 32 with a reversing valve generally indicated at 33 comprising separately functioning valve rotors 34, 35, 36 and 37 mounted on the same shaft and rotatable as a unit. This valve serves to reverse the flow of refrigerant so that the coil 21 acts as the condenser and the coil 25 functions as the evaporator, and thus permits the system to be used for cooling the building when desired.

In normal operation, the refrigerant, which may be any conventional refrigerating gas such as Freon, is supplied to the compressor 22, from which it passes through the line 41 and valve rotor 36 to the lines 42 and 43, and thence to the refrigerant coil 25 in the air duct 26. The hot refrigerant condenses and is cooled in this coil, and the heat given off heats the air passing from the blower 27 to the outlets 28 and 29, and thus to act as a space heater for the interior of the building. The refrigerant fluid leaving the coil 25 passes through the lines 44 and 55 to the valve rotor 37, and thence through the line 46 to the liquid reservoir 31. From the reservoir the refrigerant passes through the expansion valve 32 and thence through the line 47 and valve rotor 34 to the line 48 and into the line 49 leading to the coil 21. The coil 21 functions as the evaporator coil of the system, and since it is positioned in the reservoir 12, the refrigerant vaporizing in the coil draws the heat from the waste liquids in the reservoir. The heat laden refrigerant then flows upwardly through the lines 51 and 52 to the valve rotor 35 and thence through the line 53 to the suction side of the compressor, completing the cycle of flow.

From the foregoing, it will be seen that the warm fluids in the reservoir 12 provide an adequate source of heat that may be salvaged by the heat exchange system and used to heat the coil 25, so that the interior of the building may be warmed without the need of any direct combustion, and consequently with a notable absence of dirt and smoke. The provision of the reservoir 12 and the utilization of the waste fluids mark a distinct forward step in the art, since these fluids are necessarily at a higher temperature than the surrounding earth, for example, and consequently give the system a comparatively great heating capacity. In addition, the heat present in the waste fluids is ordinarily supplemented by the addition of hot water from dish water, bath water, etc., and the direct immersion of the coil 21 in the liquid permits recirculation of the liquid about the convolutions of the coil so that an efficient heat transfer is at all times possible.

In an ordinary installation the capacity of the heating system is calculated so that the heat removed from the drain fluids does not lower their temperature sufficiently to cause freezing, but even in the event of accidental freezing, it is to be noted that the drain outlet of the plumbing system will not be obstructed, since the drain pipe 16 is at a lower level than the incoming drain line 10. It follows that even if the liquid in the reservoir is frozen solid, the drain fluids will pass across the top of the ice and flow out through the pipe 16.

Under certain conditions it may be desirable to reverse the operation of the mechanism, to cool the building by withdrawing heat from the air and dissipate it into the drain liquids. This may be accomplished merely by reversing the gang valve and shifting it to the dotted line position shown, so that the coil 25 will function as the evaporator coil of the system and the coil 21 will act as the condenser. With this arrangement, it is obvious that the coil 21 will heat the waste fluids and that the unwanted heat will be carried off as the liquid flows into the drain pipe 16. In most cases even the comparatively warm waste fluids can absorb enough heat from the coil 21 to provide adequate cooling, although it is deemed advisable to provide the by-pass 17 and valve 18 so that if desired, the warm drain fluids may be by-passed through the system and cold water supplied to the reservoir from the line 19 to obtain the most efficient cooling possible.

From the above it will be apparent that this invention makes practical the use of a heat exchanging system for the purpose of heating dwellings, so that the smoke, dirt and odors necessarily present in any heating system utilizing direct combustion may be avoided.

The provision of a reservoir in the drain line of the plumbing system of the building provides a source of heat far superior to any of the various arrangements heretofore contemplated in the art, and it follows that by following the teachings of this disclosure, it becomes entirely practical to heat a building with a much smaller and less expensive heat exchanging system than heretofore required. This naturally means that operating costs are lowered, and results in a better and generally more satisfactory space heating system than heretofore suggested.

The form of the invention illustrated in the drawings is intended for illustrative purposes only and is therefore shown only in a diagrammatic form. It is to be recognized, however, that various modifications and variations of the system may be used without departing from the fundamental thought, and it is accordingly pointed out that the scope of the invention extends to any modification or variation within the terms of the appended claims.

Having thus described the invention, what I claim as new and desire to protect by United States Letters Patent is:

1. In a space heating and cooling system including a heat exchange system having a compressor and an expansion valve, with a reversing valve and a pair of heat interchanging coils adapted to alternately function as an evaporator and a condenser, the improvement that resides in the provision of a heat source for the evaporator consisting of a liquid reservoir in the waste line of the plumbing system, the reservoir having an inlet from the waste line near the top of the reservoir and an outlet to drain at a lower level than said inlet, together with a by-pass from the inlet directly to the outlet and a cold water supply line to the reservoir.

2. In a space heating and cooling system, including a heat exchange system having a compressor and an expansion valve with a reversing valve and a pair of heat interchanging coils adapted to alternately function as an evaporator and a condenser, the improvement that resides in the provision of a heat source for the evaporator consisting of a liquid reservoir in the waste line of the plumbing system, the reservoir having an inlet from the waste line to supply waste fluid to the reservoir and an outlet to the drain; with the heat interchanging coil in the reservoir positioned below the liquid level, whereby the coil will be substantially submerged in the waste liquid.

JOHN R. BAYSTON.

REFERENCES CITED

The following references are of record in the file of this patent:

UNITED STATES PATENTS

| Number | Name | Date |
|---|---|---|
| 1,783,033 | Boltz | Nov. 25, 1930 |
| 1,889,156 | Shepherd | Nov. 29, 1932 |
| 2,071,178 | Roessler | Feb. 16, 1937 |